US010685265B2

(12) United States Patent
Sewak et al.

(10) Patent No.: US 10,685,265 B2
(45) Date of Patent: Jun. 16, 2020

(54) COGNITIVE ANALYSIS AND CLASSIFICATION OF APPAREL IMAGES

(71) Applicant: International Business Machines Corporation, Armonk, NY (US)

(72) Inventors: Mohit Sewak, Pune (IN); Karthik P. Hariharan, Bangalore (IN); Irina Fedulova, Moscow (RU)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 15/950,738

(22) Filed: Apr. 11, 2018

(65) Prior Publication Data
US 2019/0318209 A1    Oct. 17, 2019

(51) Int. Cl.
| G06K 9/00 | (2006.01) |
| G06K 9/66 | (2006.01) |
| G06N 5/02 | (2006.01) |
| G06K 9/62 | (2006.01) |
| G06N 3/08 | (2006.01) |

(52) U.S. Cl.
CPC ............. *G06K 9/66* (2013.01); *G06K 9/6268* (2013.01); *G06N 3/08* (2013.01); *G06N 5/022* (2013.01); *G06K 2209/27* (2013.01)

(58) Field of Classification Search
CPC combination set(s) only.
See application file for complete search history.

(56) References Cited

U.S. PATENT DOCUMENTS

| 2007/0244842 | A1* | 10/2007 | Ishii ..................... G06K 9/4628 706/18 |
| 2014/0379426 | A1 | 12/2014 | Guo et al. |
| 2015/0058079 | A1 | 2/2015 | Freund et al. |
| 2015/0139485 | A1* | 5/2015 | Bourdev ............ G06K 9/00362 382/103 |

(Continued)

FOREIGN PATENT DOCUMENTS

| CN | 104281890 A | 1/2015 |
| WO | 2010141637 A1 | 12/2010 |
| WO | 2016098973 A1 | 6/2016 |

OTHER PUBLICATIONS

U.S. Appl. No. 15/950,692 "Cognitive Fashion-Ability Score Driven Fashion Merchandising Acquisition," filed Apr. 11, 2018.

(Continued)

*Primary Examiner* — Alex Kok S Liew
(74) *Attorney, Agent, or Firm* — Patterson + Sheridan, LLP

(57) ABSTRACT

As disclosed, f-scores can be generated for apparel items. Training images are identified, where each training image is associated with a corresponding set of tags including information about a plurality of attributes. A first convolutional neural network (CNN) is trained based on the plurality of training images and a first attribute. The first CNN is iteratively refined by, for each respective attribute, removing a set of neurons from the first CNN and retraining the first CNN based on the training images and the respective attribute. Upon determining that the first CNN has been trained based on each of the attributes, one or more CNNs are generated based on the first CNN. An image is received, where the image depicts an apparel item. The image is processed using the one or more CNNs, and an f-score for the apparel item is determined based on the output.

11 Claims, 7 Drawing Sheets

(56) References Cited

U.S. PATENT DOCUMENTS

2016/0189274 A1 6/2016 MacLaurin et al.
2016/0225053 A1* 8/2016 Romley .................... G06T 7/11
2018/0005106 A1 1/2018 Hachiya

OTHER PUBLICATIONS

U.S. Appl. No. 16/449,601, "Cognitive Analysis and Classification of Apparel Images," filed Jun. 24, 2019.
IBM, "List of IBM Patents or Patent Applications Treated As Related," for U.S. Appl. No. 16/438,822, filed Apr. 11, 2018.
U.S. Appl. No. 16/438,822 "Cognitive Fashion-Ability Score Driven Fashion Merchandising Acquisition," filed Jun. 12, 2019.
IBM, "List of IBM Patents or Patent Applications Treated As Related," dated Apr. 11, 2018.
U.S. Appl. No. 15/950,692 "Cognitive Analysis and Classification of Apparel Images ," filed Apr. 11, 2018.

* cited by examiner

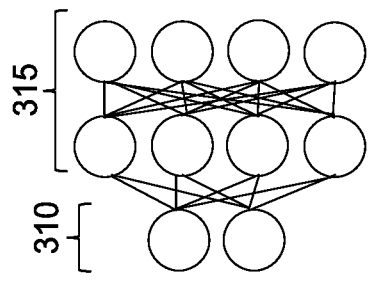
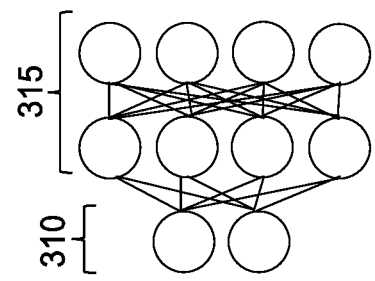
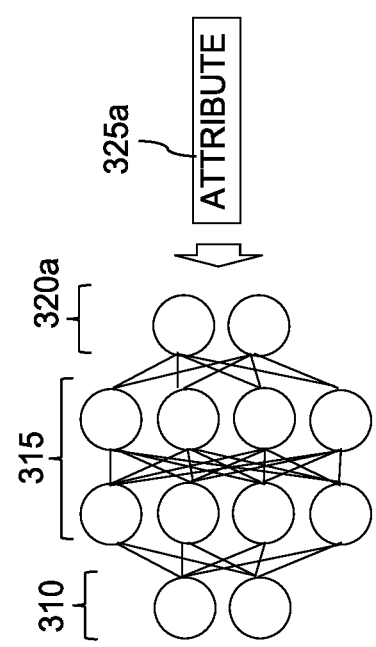
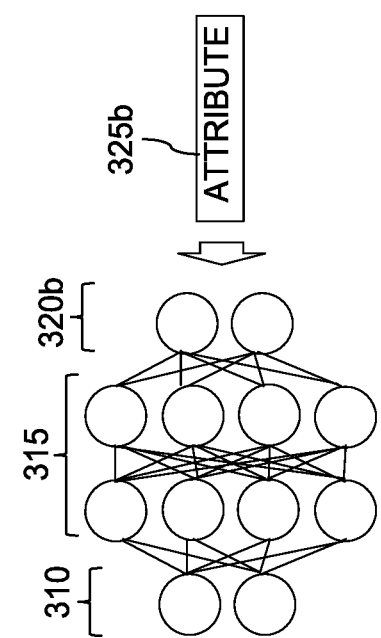
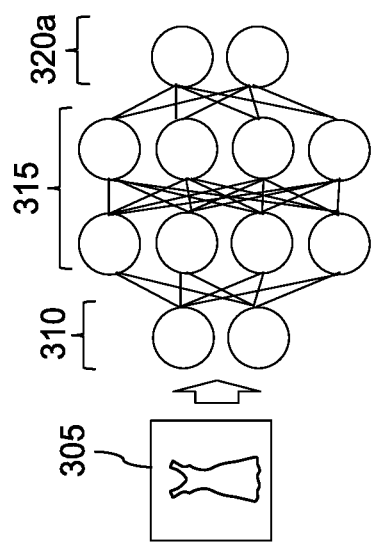
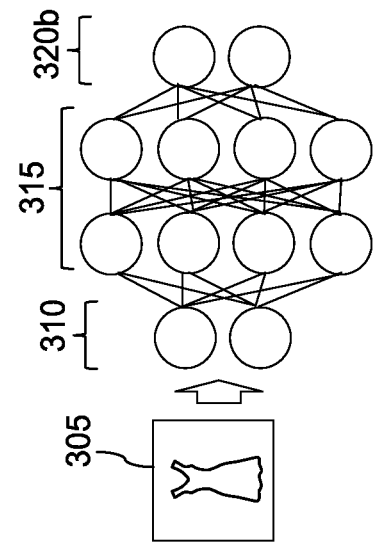

COGNITIVE ANALYSIS AND CLASSIFICATION OF APPAREL IMAGES

BACKGROUND

The present disclosure relates to convolutional neural networks, and more specifically, to performing cognitive analysis of images of apparel items utilizing customized convolutional neural networks.

Much of the recent progress in commerce (particularly commerce on the Internet) is often attributed to the backed analytics enabled by the platform, which helps to understand market demand and allows managers to fine-tune their offerings to better suit customer needs and desires. One of the fastest growing segments of commerce today involve fashion apparel, including accessories, footwear, clothing, jewelry, and the like. Apparel item sales are a highly personalized category of commerce, and typically involve very low conversion rates along with high return rates. Vendors are simply unable to customize their offerings to each individual customer due to the low conversion rates and highly personalized nature of the purchase. Systems and methods to cognitively analyze and classify apparel items in a quantitative manner are needed.

SUMMARY

According to one embodiment of the present disclosure, a computer program product comprising a computer-readable storage medium having computer-readable program code embodied therewith is disclosed. The computer-readable program code is executable by one or more computer processors to perform an operation. The operation includes identifying a plurality of training images, wherein each training image depicts a respective apparel item, and wherein each training image is associated with a corresponding set of tags, each tag including information about a respective attribute in a plurality of attributes. A first CNN is trained based on the plurality of training images and a first attribute in the plurality of attributes. The operation further includes iteratively refining the first CNN by, for each respective attribute in the plurality of attributes, removing a set of neurons from the first CNN, wherein the removed set of neurons correspond to a classifier, prediction, or multinomial-prediction layer, and retraining the first CNN based on the plurality of training images and the respective attribute. Upon determining that the first CNN has been trained based on each of the plurality of attributes, a first set of one or more trained CNNs is generated based on the first CNN. The operation further includes receiving a first image to be classified based on the plurality of attributes, wherein the first image depicts a first apparel item. The first image is processed using the first set of one or more trained CNNs to generate one or more results vectors, and an f-score for the first apparel item is determined, based on the one or more results vectors.

According to another embodiment of the present disclosure, a system comprising one or more computer processors and a memory containing a program which when executed by the one or more computer processors performs an operation is disclosed. The operation includes training a first set of one or more CNNs based on a plurality of training images and a plurality of sets of attributes, wherein each of the plurality of sets of attributes corresponds to a respective training image in the plurality of training images. The operation further includes receiving a first image to be classified based on the plurality of attributes, wherein the first image depicts a first apparel item. The first image is processed using the first set of one or more CNNs to generate one or more results vectors, and an f-score for the first apparel item is determined, based on the one or more results vectors.

BRIEF DESCRIPTION OF THE SEVERAL VIEWS OF THE DRAWINGS

FIGS. 3a to 3f illustrate a method for training convolutional neural networks to classify and analyze apparel items, according to one embodiment disclosed herein.

DETAILED DESCRIPTION

Embodiments of the present disclosure introduce f-scores, which are quantitative and objective descriptions of apparel items. By analyzing images of apparel items using unique convolutional neural networks (CNNs), an f-score can be generated for each apparel item depicted in the image. In various embodiments, these f-scores can then be used to enable a variety of use-cases that were previously not possible. As used herein, an apparel item may include any fashion item, including jewelry, clothing, footwear, accessories, headwear, and the like. In many embodiments, the attributes of an apparel item that affect how humans perceive it can be exceedingly subtle, and include subconscious aspects that individuals do not even realize they are considering. Similarly, in many implementations, the concepts that determine how to analyze and classify an apparel item can vary significantly across categories and subcategories of apparel.

To address this disparity, in one embodiment, a set of one or more CNNs are trained for each category or subcategory of apparel. For example, in such an embodiment, a first set of convolutional neural networks may be trained to process shoes, while a different set of CNNs is utilized to process dresses. Similarly, in some embodiments, the categories are defined more narrowly in order to better align and classify the items. For example, in one embodiment, there may be a first set of CNNs configured to generate f-scores for dress shoes, while a different set of neural networks processes athletic shoes. In one embodiment, the resolution used, or the granularity/specificity of the categories, can be determined based on the particular implementation. For example, a retailer specializing in footwear may require more specialized models for each specific category, while a broader retailer that only sells a few shoes may not require such specificity. Although convolutional neural networks are used as an example throughout the present disclosure, any suitable machine learning model, such as a deep learning model, image analysis model, and the like, may be applied in various embodiments. Furthermore, as used herein, references to training a CNN and processing images with a CNN indicate that a convolutional neural network model (as opposed to the CNN architecture itself) is trained or used to process images.

Figure 1:
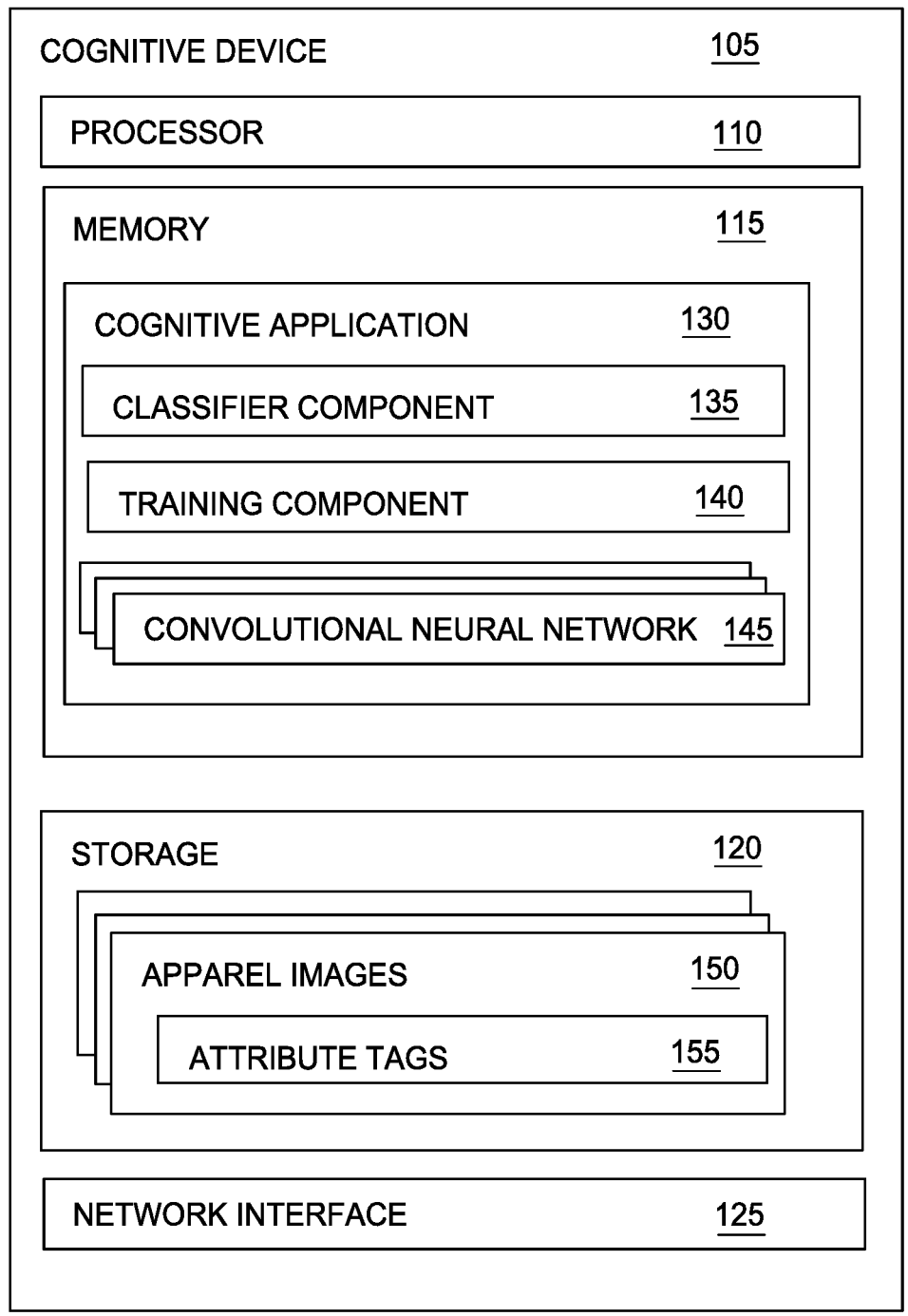
FIG. 1 is a block diagram of a cognitive device, according to one embodiment disclosed herein.

FIG. 1 is a block diagram of a Cognitive Device 105, according to one embodiment disclosed herein. As illustrated, the Cognitive Device 105 includes a Processor 110, a Memory 115, Storage 120, and a Network Interface 125. In the illustrated embodiment, Processor 110 retrieves and executes programming instructions stored in Memory 115 as well as stores and retrieves application data residing in Storage 120. Processor 110 is representative of a single CPU, multiple CPUs, a single CPU having multiple processing cores, and the like. Memory 115 is generally included to be representative of a random access memory. Storage 120 may be a disk drive or flash-based storage device, and may include fixed and/or removable storage devices, such as fixed disk drives, removable memory cards, or optical storage, network attached storage (NAS), or storage area-network (SAN). In the illustrated embodiment, the Cognitive Device 105 may be communicatively coupled with other devices through the Network Interface 125.

In the illustrated embodiment, the Memory 115 includes a Cognitive Application 130. The Cognitive Application 130 includes a Classifier Component 135, a Training Component 140, and a plurality of Convolutional Neural Networks 145. The Classifier Component 135 is generally configured to receive images of apparel items and determine which category of apparel item is depicted. In some embodiments, the Classifier Component 135 may include one or more machine learning models. In some embodiments, the Classifier Component 135 utilizes a deep learning system, such as IBM's Watson. In one embodiment, the Classifier Component 135 is trained based on the system in which it will be utilized. That is, in one embodiment, the Classifier Component 135 is trained based on the specific categories that are to be used in the particular implementation.

In one embodiment, the Classifier Component 135 is trained using labeled training data, such as Apparel Images 150. In the illustrated embodiment, each Apparel Image 150 stored in Storage 120 includes associated metadata describing the image, and/or describing apparel item depicted therein. For example, as illustrated, each Apparel Image 150 includes one or more Attribute Tags 155. In one embodiment, one such Attribute Tag 155 indicates which category the depicted apparel item belongs to. In this way, the tagged Apparel Images 150 can be used to train one or more cognitive models in the Classifier Component 135. For example, in one embodiment, each Apparel Image 150 is provided to a machine learning model as input, and the tagged category is provided as target output. After being trained, the Classifier Component 135 can then receive untagged Apparel Images 150 and determine which category or categories the depicted apparel item(s) belong to.

In some embodiments, the Apparel Images 150 used to train the Classifier Component 135 may be manually tagged or sorted by users based on the depicted apparel category. In some embodiments, one or more web crawlers can be utilized to automatically retrieve and tag the images for use. In one embodiment, web searches (e.g., on the Internet) can be initiated based on strings corresponding to each desired category, and the resulting images can be retrieved for training the Classifier Component 135. For example, in such an embodiment, training images for formal dresses may be retrieved by conducting one or more web searches for "formal dress," "evening gown," and other similar text strings that describe apparel items within the desired category. The retrieved images may then be automatically tagged with the appropriate category, which facilitates training of the Classifier Component 135. In some embodiments, the Classifier Component 135 also generates a confidence measure indicating how reliable the classification is. In some embodiments, if the generated confidence measure is below a predefined threshold, the image may be rejected, or flagged for verification by a user.

In the illustrated embodiment, the Cognitive Application 130 also includes a Training Component 140 which is used to generate and train the Convolutional Neural Networks 145. As discussed above, in some embodiments, there are one or more Convolutional Neural Networks 145 corresponding to each identified category of apparel. As will be discussed in more detail below, each Convolutional Neural Network 145 may be trained utilizing Apparel Images 150 and their corresponding Attribute Tags 155, such that the Convolutional Neural Networks 145 can process new untagged Apparel Images 150 and quantify the various attributes of the depicted apparel item. In various embodiments, the Attribute Tags 155 may include information regarding any number of attributes. For example, in various embodiments, such attributes may include the contemporariness of the apparel item (e.g., as determined based on the year the apparel item was released/announced or the year the associated image was published/featured), the designer of the apparel item, the brand of the apparel item, the publication that featured the apparel item (i.e., the magazine, website, television channel, etc. that published the corresponding image), and the like. Similarly, in some embodiments, additional attributes may include what the object is (e.g., a shirt, pants, shoes, etc.), the material the item is made of, a pattern of the material, a name of the item, an age-group associated with the item, a gender the item is designed for, price of the item, and the like. In some embodiments, the attributes may further include indications of the popularity of the item, such as survey responses, social media reactions, and the like.

In a related embodiment, the Convolutional Neural Networks 145 may additionally be trained on any number of concepts relating to the apparel items. For example, in some embodiments, one or more Convolutional Neural Network 145 may be trained based on concepts that influence fashion tastes across geography, time-periods, age-groups, socio-economic classes, social-media trends, movies and other events (with trends across different channels/age-groups, as well as an actor/model who was seen sporting which fashion), fashion magazines, designers (and their ranking/rating and associations), brand houses (and ranking of each), materials (and classes of each, with their association with different fashion), patterns (with types and association), along with cuts and styles of different fashion-related concepts for a sub-category as in fashion glossary, price-perception (ideal price as people suggest in formal/informal surveys for a particular dress), actual price (on a given channel/s), cost, and the like.

In order to facilitate the training of the Convolutional Neural Networks 145, the Apparel Images 150 may be tagged in a number of ways. For example, in one embodiment, users review each Apparel Image 150 to identify each attribute and tag it. In some embodiments, surveys may be utilized to identify the trendiness of an apparel item depending on the geographic region, age group, socio-economic class, and the like. In some embodiments, the Apparel Images 150 are retrieved by one or more web crawlers that conduct Internet searches using predetermined strings corresponding to the desired attributes. For example, to retrieve and tag apparel images used to train a Convolutional Neural Network 145 based on the designer of an evening gown, one or more web searches may be conducted using a strings such as "DesignerA evening gown," "DesignerB evening gown," "evening gown+DesignerC," and the like. The retrieved images can then be automatically tagged based on the search terms utilized to retrieve them. Similarly, in order to train a Convolutional Neural Network 145 based on the contemporariness of jewelry, web searches may be initiated with specific time constraints (e.g., per year, per three-year period, and the like).

Figure 2:
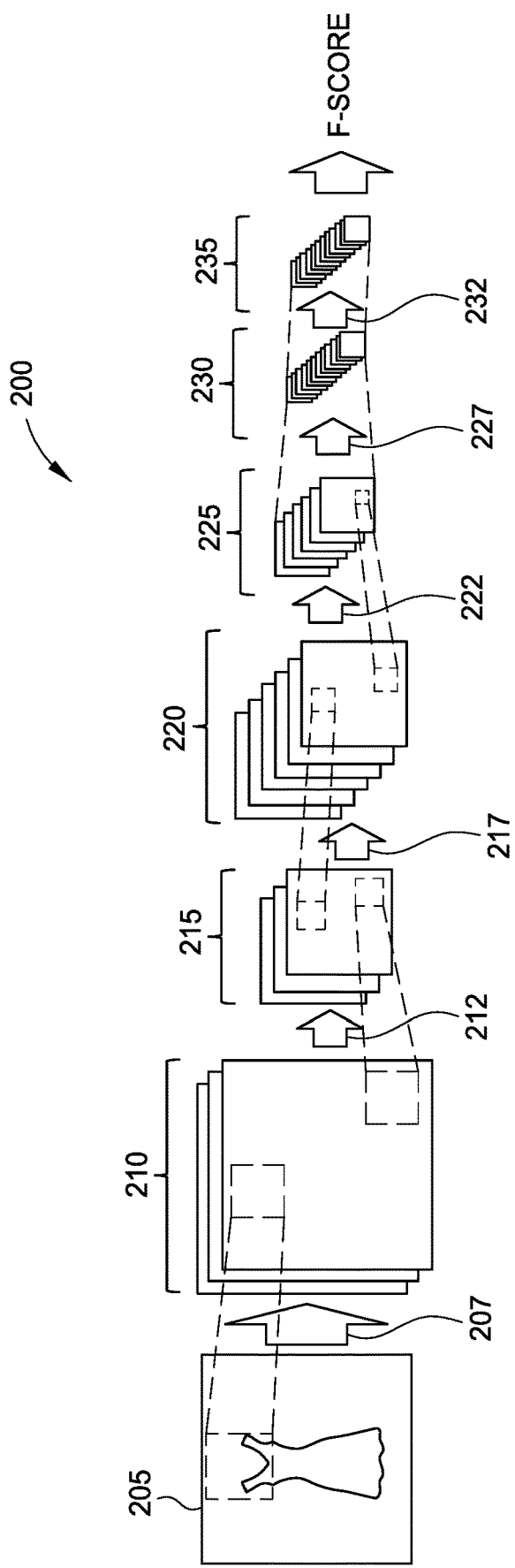
FIG. 2 illustrates a convolutional neural network configured to analyze and classify apparel items, according to one embodiment disclosed herein.

FIG. 2 illustrates a CNN 200 configured to analyze and classify apparel items, according to one embodiment disclosed herein. In the illustrated embodiment, the CNN 200 receives an Image 205 of an apparel item (the depicted Image 205 is a women's dress), and outputs an F-Score. In some embodiments, the F-Score is a single value (e.g., between 0 and 1) quantifying the apparel item. In some embodiments, the generated F-Score is an N-dimensional vector, where N is the number of attributes used in the particular implementation. In one embodiments, the F-Score does not indicate how "fashionable" the apparel item is (such that an f-score of 0.7 is "more fashionable" than an f-score of 0.2), but rather is a quantitative value that can be used to compare apparel items to determine their objective similarity based on fashion attributes. That is, a dress with an F-Score of 0.4 may not be less fashionable than a dress with an f-score of 0.7, but all dresses with F-Scores of about 0.4 may be grouped together as satisfying similar fashion preferences.

In some embodiments, each CNN 200 is configured to analyze images based on a particular attribute, and the generated results (e.g., results vectors) are aggregated to generate the f-score. In other embodiments, a single CNN 200 may be configured to analyze images according to all of the attributes, and generate a multi-dimensional vector as the f-score, where each dimension corresponds to a particular attribute. As discussed above, in some embodiments, each category of apparel item may correspond to a set of one or more convolutional neural networks, and a CNN 200 trained to process a first category is not also used to process a second category of apparel.

In the illustrated embodiment, processing the input Image 205 with the CNN 200 involves a number of processing steps spread across a number of layers of neurons. For example, in one embodiment, processing the image may include one or more of convolution steps, non-linearity steps, pooling or sub-sampling steps, and classification steps. In the illustrated embodiment, the first operation (illustrated by arrow 207) is a convolution step. A convolution step typically involves processing the input region with one or more filters or feature detectors. For example, the convolution step may involve sliding a filter or feature detector (e.g., a predefined matrix of values) across the Image 205 (i.e., across a matrix of values corresponding to the pixel values at each pixel) and utilizing element-wise multiplication or dot products to generate a convolved feature, feature map, or activation map based on the corresponding pixel data. In the illustrated embodiment, three feature detectors are used, such that the generated Feature Map 210 has a depth of three. Of course, in various embodiments, any number of filters may be utilized.

In some embodiments, non-linearity is also introduced by replacing all negative values in the Feature Map 210 with a zero. In some embodiments, this operation is performed alongside the convolution step 207. As illustrated, the next processing step involves pooling 212 to create more manageable Feature Maps 215. For example, in the illustrated embodiment, pooling involves reducing the size of the Feature Maps 210 (e.g., reducing the size of the corresponding matrices) by using the maximum value in each region as the value in the pooled Feature Map 215. In the illustrated embodiment, the Convolutional Neural Network 200 includes an additional set of convolution, non-linearity, and pooling operations (e.g., as indicated by arrows 217 and 222). In various embodiments, any number of convolution operations may be utilized in the particular CNN 200, depending on the particular implementation.

As illustrated by arrow 227, after the convolution steps have been completed, the data is passed to one or more Classifier Layers 230 and 235. In one embodiment, these Classifier Layers 230 and 235 are fully connected, indicating that every neuron in the previous layer is connected to every neuron in the subsequent layer. For example, in one embodiment, the output data from the last step in the "middle" or "hidden" layers of the CNN 200 represent high-level features of the input image, and the Classifier Layers 230 and 235 utilize these detected features to classify the image based on the defined attribute(s) used to train the CNN 200. In one embodiment, the one or more Classifier Layers 230 and 235 include a softmax activation function. The result of this processing is an F-Score that quantifies the apparel item in the Image 205 according to the defined attributes. This F-Score can then be utilized to compare items, and determine apparel items that the selected item is objectively similar to (based on the attributes). Of course, although a particular CNN architecture is depicted, any neural network architecture or model can be used in various embodiments.

FIGS. 3a to 3f illustrate a method for training convolutional neural networks to classify and analyze apparel items, according to one embodiment disclosed herein. In the illustrated embodiment, transfer learning is utilized to train the convolutional neural network on each attribute. Notably, although the illustrated embodiment depicts each layer as fully connected, in implementation, one or more layers may not be fully connected. In some embodiments, only the classifier layer(s) is fully connected. Similarly, although a particular architecture is illustrated, in various embodiments, any suitable neural network architecture can be used. In FIG. 3a, an input Image 305 is provided to an Input Layer 310 of the convolutional neural network. Although the depicted CNN has two input neurons, there may of course be any number of neurons in various embodiments. The data is then passed to one or more Middle Layers 315 (sometimes referred to as "hidden" layers), where it is processed as described above. Although two middle layers are illustrated, there may of course be any number of middle layers in various embodiments. Similarly, although each middle layer is depicted as including four neurons, there may of course be any number in actual implementation.

In the illustrated embodiment of FIG. 3a, a Classifier Layer 320a includes two neurons. As discussed above, in various embodiments there may be multiple Classifier Layers 320a, each with any number of neurons. In some embodiments, there may be multiple fully connected layers, with only the last layer included as a Classifier Layer 320a. When the Image 305 is provided to the CNN, some output is produced by the Classifier Layer 320a. Before the CNN is trained, this output is arbitrary. As illustrated in FIG. 3b, a first target Attribute 325a is used to train to the CNN for the Image 305. For example, in some embodiments, this output is compared to the target Attribute 325a and the comparison is evaluated using a loss function. The calculated loss can then be propagated backwards through the CNN. As this data propagates backwards towards the Input Layer 310, the weights associated with each neuron are updated to train the CNN. In an embodiment, this process (illustrated in FIGS. 3a and 3b) is repeated for each training Image 305 available (and the corresponding Attribute 325a). After processing each training Image 305, the CNN is fully trained and ready to receive new (untagged) images and process them to generate a value or vector reflecting the Attribute 325a. In one embodiment, based on this resulting vector, the apparel item depicted in the input image can be compared with other apparel items which have also been processed by the CNN. For example, if the resulting vector is 0.4, the apparel item is similar (with regards to the Attribute 325a) to other apparel items which also scored 0.4.

Although not illustrated, in some embodiments, the Attribute 325a and/or Image 305 may be vectorized or processed in some other way prior to processing with the CNN. In some embodiments, the training Images 305 may be cropped to include different areas or regions depicting particular aspects of the apparel. For example, in one embodiment a single image may be used to create several training images by cropping to different areas (e.g., the sleeve of a shirt, the neckline, and the like). In some embodiments, the images are also pre-processed to harmonize their size and/or scale. In one embodiment, the system extracts the intensity of the training images across all color channels available. In some embodiments, the corresponding Attributes 325a may be stored in a distinct repository, or as metadata associated with the corresponding image.

In one embodiment, the generated f-score is dependent on only a single attribute. In such an embodiment, once the CNN has been trained based on the Attribute 325a, new images can be assigned f-scores based on their similarity relative to this Attribute 325a. In other embodiments, however, multiple attributes are used to score and classify apparel items, in order to provide a broader understanding. In one embodiment, a new CNN is trained for each attribute, or the weights of the middle layers may be trained based on many such attributes. In some embodiments, transfer learning is utilized. For example, in one embodiment, once the CNN has been trained based on the first Attribute 325a, the final Classifier Layer(s) 320a are removed from the CNN, as illustrated in FIG. 3c. As discussed above, in an embodiment, the resulting output from the last Middle Layer 315 represents high-level features of the input image, but does not classify the input image or score the image based on the Attribute 325a. As illustrated in FIG. 3d, in one embodiment, a new Classifier Layer 320b (e.g., one or more classifier layers with any number of neurons) are generated and added to the existing CNN layers 310 and 315. Because of the above training, these layers 310 and 315 are already configured to recognize features in apparel items, but cannot classify these features or generate an f-score. In some embodiments, this transfer is accomplished by extracting the weight matrix from the middle layer(s), and creating a new CNN using those weights. A new classifier layer(s) can then be trained for the new attribute.

As illustrated in FIG. 3e, a new Attribute 325b is then provided as the target output for the Image 305, in order to train the new Classifier Layer 320b. In some embodiments, retraining the CNN in this way constitutes propagating the data (e.g., the results of a loss function comparing the actual output to the target Attribute 325b) back through the CNN towards the Input Layer 310, and updating or refining the weights associated with each neuron along the way. In such an embodiment, some or all of the Middle Layers 315 of the CNN can also be retrained or refined based on the second Attribute 325b. In some embodiments, only the Classifier Layer 320b is trained, and the weights associated with the Middle Layers 315 are frozen. In some embodiments, one or more of the Middle Layers 315 may have their weights refined, while one or more other Middle Layers 315 are frozen and unchanged.

After this second training has been completed for all of the available tagged training images, the CNN is capable of processing new images to score them according to the second Attribute 325b. In some embodiments, as illustrated in FIG. 3f, this new classifier layer is then stripped, so that the CNN can be trained based on yet another attribute. In some embodiments, this pruning and retraining process is iterated for each attribute that is to be used. Once all attributes have been trained, the Cognitive Application 130 may generate one or more convolutional neural networks based on this training. In some embodiments, the pruned classifier layers are also utilized. That is, in an embodiment, the Cognitive Application 130 stores each of the classifier layers for each corresponding attribute (and may also store the entire CNN). When all attributes have been trained, these stored layer(s) can be used to process new images as they are received.

For example, in one embodiment, the fully trained CNN is replicated a number of times, such that there is one CNN for each attribute. At this point, in one embodiment, each classifier layer that was removed is then added back onto one of the fully trained CNNs, so as to create N fully configured CNNs, one for each of N attributes. In some embodiments, the weight matrix was extracted from the middle layer(s) to train the other CNNs, and the trained CNN is simply stored with a reference to the corresponding attribute it was trained for. These trained CNNs can then be retrieved as part of the process of generating the final CNNs. In some embodiments, a new classifier layer is trained for each attribute, to create N CNNs (one for each of N attributes). In some embodiments, a single CNN may be used, and one or more classifier layers are trained to score and classify the input image across multiple attributes. Additionally, rather than utilizing transfer learning as discussed above, in some embodiments a single CNN is trained based on all of the attributes at once. For example, in one embodiment, for each apparel image used as training input, the associated attributes are used as target output. In embodiments, this f-score may be an N-dimensional vector corresponding to N attributes.

In some embodiments, the particular attributes used to train the CNN(s) or classify or score a particular apparel item may be selected by a user, and any permutation may be used. For example, suppose three attributes are available for a given apparel category: the source of the image, the model who wore the garment in the image, and the designer who designed the apparel item. In some embodiments, some models may be trained to distinguish a new image with respect to its source (i.e. from which fashion magazine it is), while another CNN may be trained to determine the designer, and the yet another is trained based on a combination of source and designer. Similarly, in such an embodiment, another CNN may be trained based on a combination of the model, designer, sand source. In one embodiment, though the actual classification happens in the last classification layer(s), one or more middle layers (after training) contain the important mathematical representations of how the apparel items differ from one attribute value to another. Thus, in one embodiment, the model(s) implicitly convert these important concepts into mathematical dimensions.

In some embodiments, in addition to classification (e.g., based on attributes related to age, designer, and the like), one or more CNNs are trained based on numerical or continuous attributes like price. For example, in one embodiment, individuals can be surveyed to determine a price at which they would purchase a depicted product. This perceived price may then be used as a numerical attribute. Similarly, in some embodiments, the actual sale price of the apparel may be used as a numerical attribute to refine one or more CNNs. Other examples of continuous attributes include how much each age or age group likes the product. For such a continuous variable, one or more CNNs may be used to predict the attribute, rather than classify the product. In such an embodiment, combining the results of the trained CNN(s) may be accomplished by simply multiplying or adding the continuous attributes together.

Thus, in one embodiment, many different models may be created, each learning how to predict (for continuous data) or distinguish (for categorical data) across values, levels, and classes of different combinations of many different attributes. Further, according to embodiments disclosed herein, the insights of these models across all the possible combination of attributes can be utilized to represent a unified and sophisticated concept of underlying fashion in any new image that is processed with the model(s). In an embodiment utilizing categorical data (e.g., which designer designed the product), the last layer of the corresponding CNN may generally be referred to as a classifier layer. In one embodiment, the classifier layer has a number of neurons equal to the number of categories in the corresponding attribute being classified. For example, if there are N designers in the training data, the classifier layer may have N neurons, each corresponding to one of the N designers. Similarly, in embodiments utilizing continuous data (e.g., price), the last layer of the corresponding CNN is generally referred to as a prediction layer. In one embodiment, the prediction layer includes a single neuron which outputs the predicted value (e.g., price). In some embodiments, a CNN may be trained based on both categorical and continuous data (e.g., on a designer attribute with N options, as well as a price attribute). In such an embodiment, the final layer of the CNN may be referred to as a multinomial-prediction layer. In one embodiment, this multinomial-prediction layer may include N neurons for N designers, with each of the N nodes providing a prediction for the continuous variable at the corresponding designer.

In one embodiment, each CNN may be associated with a tag (e.g., in metadata) indicating whether the training was successful, as well as the date at which it was last trained. For example, in one embodiment, a set of validation images can be processed by the trained CNN, and the output can be analyzed to determine whether the CNN produces satisfactory results. If the results are not satisfactory, in one embodiment, the CNN is not used for classifying or scoring new images. In some embodiments, additional training images are retrieved to continue training the model.

In some embodiments, in addition to training models to classify and score apparel images based on any number and combination of attributes, a vector representing the trends or popularity of each class may be created for each attribute. For example, suppose the designer of the item is used as an attribute, and there are N designers (e.g., N categories) for the attribute. In one embodiment, a trend vector may be created with N dimensions, one for each category. This trend vector may generally relate to the popularity of the particular category. For example, if the attribute relates to designers, the trend vector may include information about the popularity of the designer on social media. In such an embodiment, a new image depicting an apparel item which was not designed by any known designer, featured in any particular magazine, or otherwise have any known value or trendiness can be processed using the above discussed CNNs to generate one or more vectors based on the trained attributes. In an embodiment, each of these vectors (corresponding to one or more attributes) can then be multiplied by the corresponding trend vector to determine how popular the item is likely to be. In various embodiments, similar operations can be completed to determine how much to charge for an item, and the like.

Figure 4:
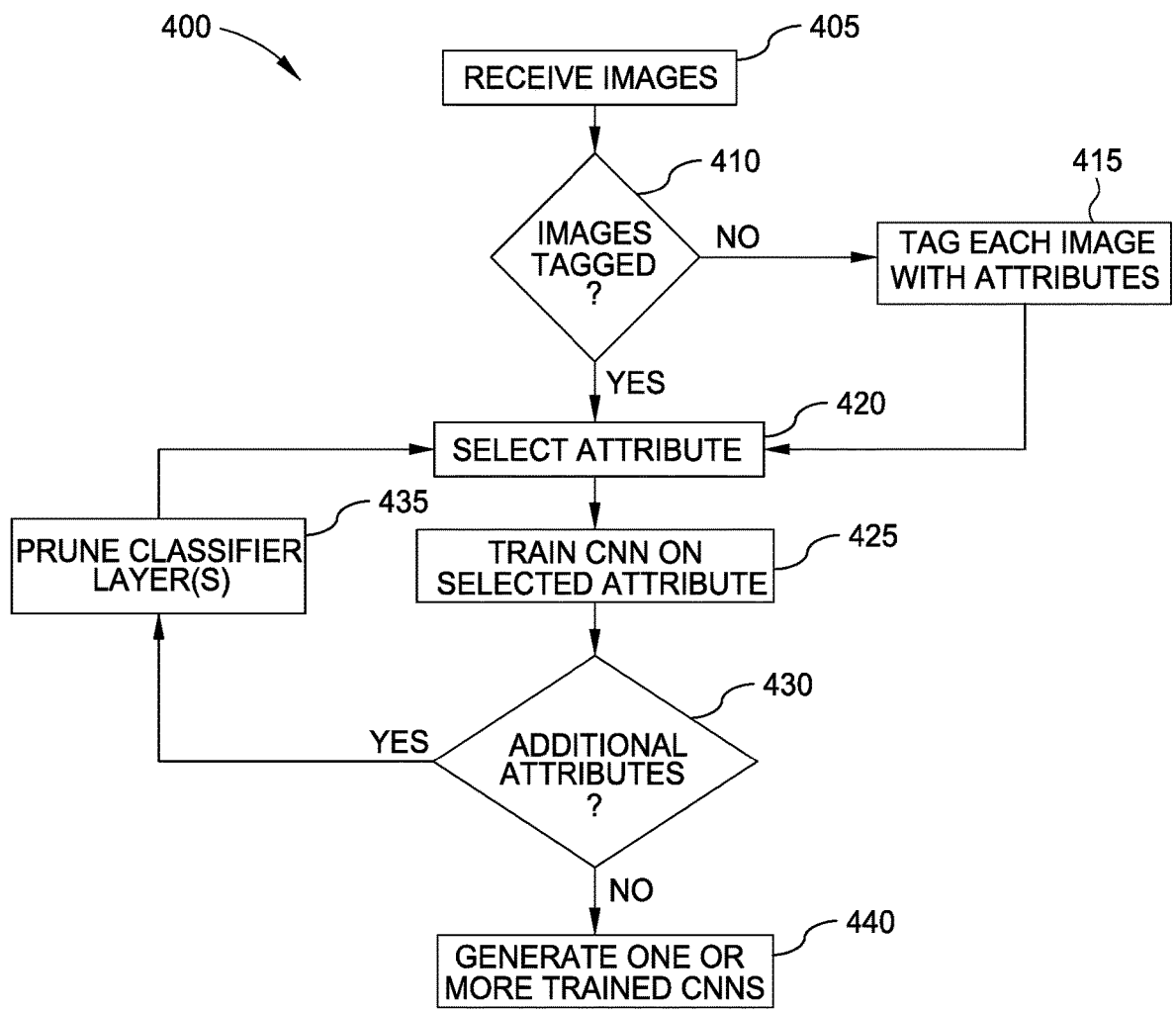
FIG. 4 is a flow diagram illustrating a method of training convolutional neural networks to classify and analyze apparel items, according to one embodiment disclosed herein.

FIG. 4 is a flow diagram illustrating a method 400 of training convolutional neural networks to classify and analyze apparel items, according to one embodiment disclosed herein. In the illustrated embodiment, the method 400 begins at block 405, where the Cognitive Application 130 receives training images. As discussed above, each of these training images may depict an apparel item of a particular category (although, depending on the method used to retrieve the images, some portion of the images may include other unwanted content as well). At block 410, the Cognitive Application 130 determines whether the images are tagged. That is, in the illustrated embodiment, the Cognitive Application 130 determines whether the training images have corresponding attribute tags. If not, the method 400 proceeds to block 415, where the images are tagged. In various embodiments, this may include automatically tagging the images based on the methodology used to retrieve them (e.g., based on the search terms used to find the image), or may be completed manually.

Once all images are tagged with their attributes, the method 400 proceeds to block 420, where the Cognitive Application 130 selects a first attribute of the desired attributes. In some embodiments, the particular attributes used may depend on the category of apparel, the environment in which the system will be used, and the like. The method 400 then proceeds to block 425, where the Cognitive Application 130 trains a convolutional neural network based on the selected attribute. At block 430, it is determined whether additional attributes remain to be trained. If so, the method 400 continues to block 435, where the weight matrix of the middle layer(s) is extracted, as discussed above. In some embodiments, this is referred to as pruning the classifier layers, as discussed above. The method 400 then proceeds to block 420 to select the next attribute. In this way, transfer learning is utilized to train the CNN based on each of the attributes.

Once all attributes have been trained, the method 400 proceeds to block 440, where the Cognitive Application 130 generates one or more trained CNNs. For example, as discussed above, in one embodiment, the trained CNN is replicated for each attribute, and a new classifier layer is generated and trained for each attribute. In one embodiment, the previously trained classifier layers are retained, and generating the one or more trained CNNs may be accomplished by referencing these stored CNNs. In some embodiments, generating one or more trained CNNs constitutes training a single classifier layer to score and classify across multiple attributes, and using a single CNN. In various embodiments, any number of CNNs may be trained based on any combination of attributes. When the method 400 terminates, one or more CNNs have been fully trained to process images of apparel items of the respective category. In embodiments, this method 400 is repeated for each category that requires training. For example, the method 400 may be completed for a formal dress category, again for an evening gown category, again for a sundress category, and the like. In such an embodiment, each category is thereby associated with a respective set of one or more CNNs that have been trained explicitly for that category.

In some embodiments, the Cognitive Application 130 may continue to refine and update the one or more CNNs as needed. For example, in one embodiment, the Cognitive Application 130 refines the CNNs with new data (e.g., images) periodically (e.g., every day, every month, etc.). In some embodiments, the Cognitive Application 130 refines the CNNs upon user request. In one embodiment, the Cognitive Application 130 can monitor public events (e.g., fashion shows, television events, movies, gatherings, and the like) to determine whether something influencing fashion has occurred. For example, after a new movie is released, the apparel featured in the movie may see a spike in demand afterward. In one embodiment, the Cognitive Application 130 may refine the CNNs based on these events. For example, the Cognitive Application 130 may process images associated with the event to determine the appropriate category, and refine the corresponding CNNs to reflect any new trends.

Figure 5:
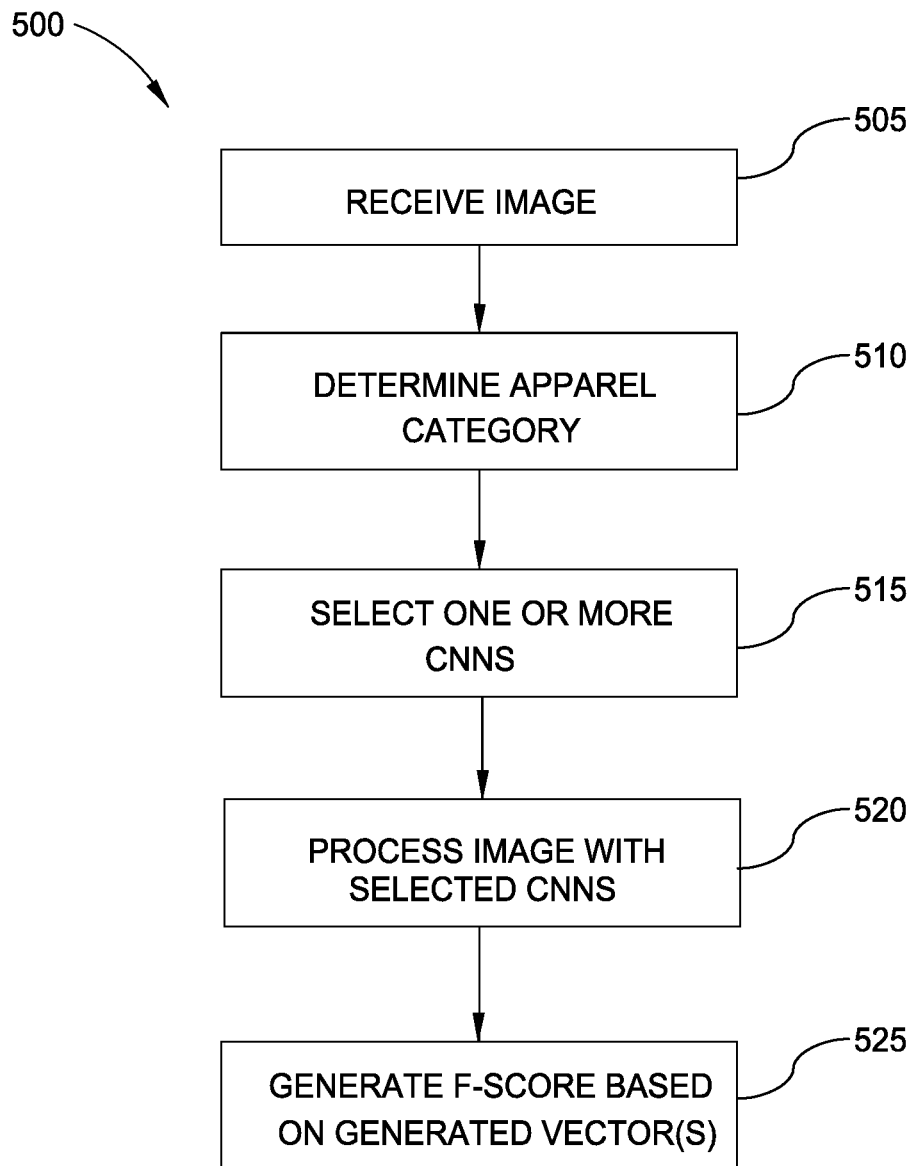
FIG. 5 is a flow diagram illustrating a method of analyzing and classifying apparel items based on images, according to one embodiment disclosed herein.

FIG. 5 is a flow diagram illustrating a method 500 of analyzing and classifying apparel items based on images, according to one embodiment disclosed herein. The illustrated method 500 occurs after the various machine learning models and/or convolutional neural networks have been trained, as discussed above. At block 505, the Cognitive Application 130 receives an image to be processed. For example, this image may include an apparel item, and lack any tags or associated attributes. At block 510, the Cognitive Application 130 determines the appropriate category for the apparel item depicted in the image. For example, as discussed above, in one embodiment, the Classifier Component 135 may process the received image with one or more machine learning models (e.g., a deep question and answer model, a neural network, and the like) to determine which category the apparel belongs to. Similarly, as discussed above, in some embodiments, the particular user of the Cognitive Application 130 determines the categories to be used, and how broad each category is. In some embodiments, if the Classifier Component 135 also generates a confidence measure that is below a predefined threshold, the method 500 terminates or pauses in order for a user to review the image and verify the category.

Once the appropriate category has been identified, the method 500 proceeds to block 515, where the Cognitive Application 130 selects one or more CNNs based on the identified category. That is, in one embodiment, each category is associated with a set of one or more convolutional neural networks that have been trained based on data corresponding to that respective category. In such an embodiment, the Cognitive Application 130 selects the appropriate set of CNNs based on the identified category in the received image. At block 520, the Cognitive Application 130 processes the received image using this selected set of one or more CNNs. As discussed above, this may result in one or more vectors or values, depending on the number of attributes used, how many CNNs are used, and the particular implementation of the embodiments disclosed herein. The method 500 then proceeds to block 525, where the Cognitive Application 130 generates an f-score for the depicted apparel item based on the generated vector(s) from the convolutional neural networks. For example, if a single CNN is used, the generated f-score may simply be the output from that CNN. If multiple CNNs are utilized, generating the f-score may comprise aggregating the generated outputs. For example, in one embodiment, the generated f-score is an N-dimensional vector, with each of the N dimensions corresponding to an attribute, and the value of each dimension being determined based on the output from one of the N CNNs used. In this way, an f-score may be based on but a combination of outputs from any number of different layers of any number of different models, each trained based on a multitude of attribute combinations.

In some embodiments, the f-score is a simplified version of the N-dimensional vector. For example, in some embodiments, a user may specify which attribute(s) they wish to utilize, and the f-score may correspond to that particular dimension in the N-dimensional vector. In one embodiment, if multiple attributes are to be considered, the corresponding values may be aggregated (e.g., by averaging the data, finding the median, finding the mode, etc.) to generate the f-score. In some embodiments, the generated f-score and/or the N-dimensional vector may be stored associated with the image or apparel item record, such as in metadata or in a separate repository with a reference to the image/item.

Figure 6:
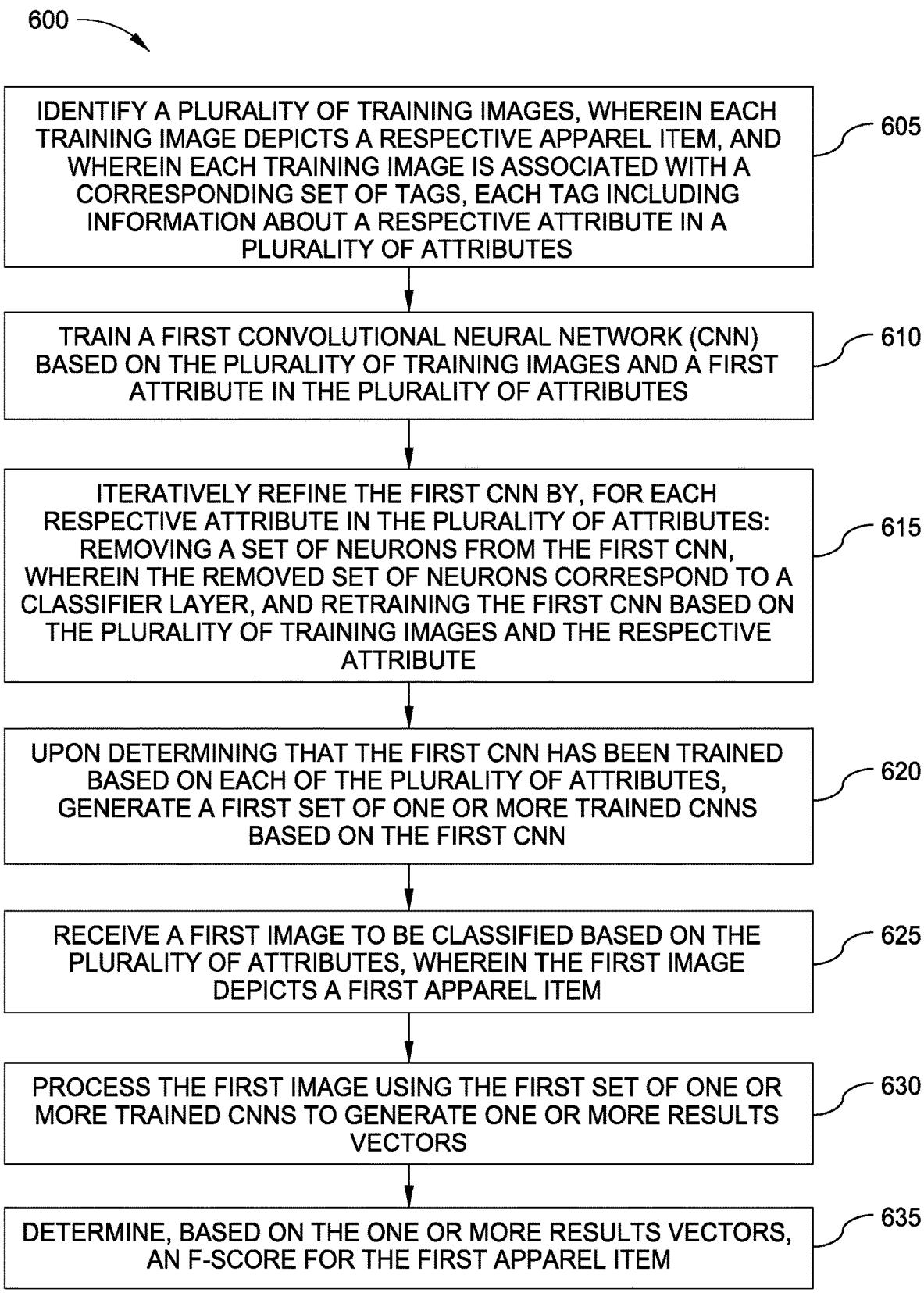
FIG. 6 is a flow diagram illustrating a method of training and using convolutional neural networks to classify apparel items, according to one embodiment disclosed herein.

FIG. 6 is a flow diagram illustrating a method 600 of training and using convolutional neural networks to classify apparel items, according to one embodiment disclosed herein. The method 600 begins at block 605, where the Cognitive Application 130 identifies a plurality of training images, wherein each training image depicts a respective apparel item, and wherein each training image is associated with a corresponding set of tags, each tag including information about a respective attribute in a plurality of attributes. The method 600 then proceeds to block 610, where the Cognitive Application 130 trains a first CNN based on the plurality of training images and a first attribute in the plurality of attributes. At block 615, the Cognitive Application 130 iteratively refines the first CNN by, for each respective attribute in the plurality of attributes, removing a set of neurons from the first CNN, wherein the removed set of neurons correspond to a classifier layer, and retraining the first CNN based on the plurality of training images and the respective attribute. As discussed above, this may be accomplished by extracting the weight matrix from the middle layer(s) and utilizing these weights with a new CNN to train a new classifier layer.

The method 600 then proceeds to block 620, where, upon determining that the first CNN has been trained based on each of the plurality of attributes, the Cognitive Application 130 generates a first set of one or more trained CNNs based on the first CNN. The method 600 then continues to block 625, where the Cognitive Application 130 receives a first image to be classified based on the plurality of attributes, wherein the first image depicts a first apparel item. At block 630, the Cognitive Application 130 processes the first image using the first set of one or more trained CNNs to generate one or more results vectors, and at block 635, the Cognitive Application 130 determines, based on the one or more results vectors, an f-score for the first apparel item.

Figure 7:
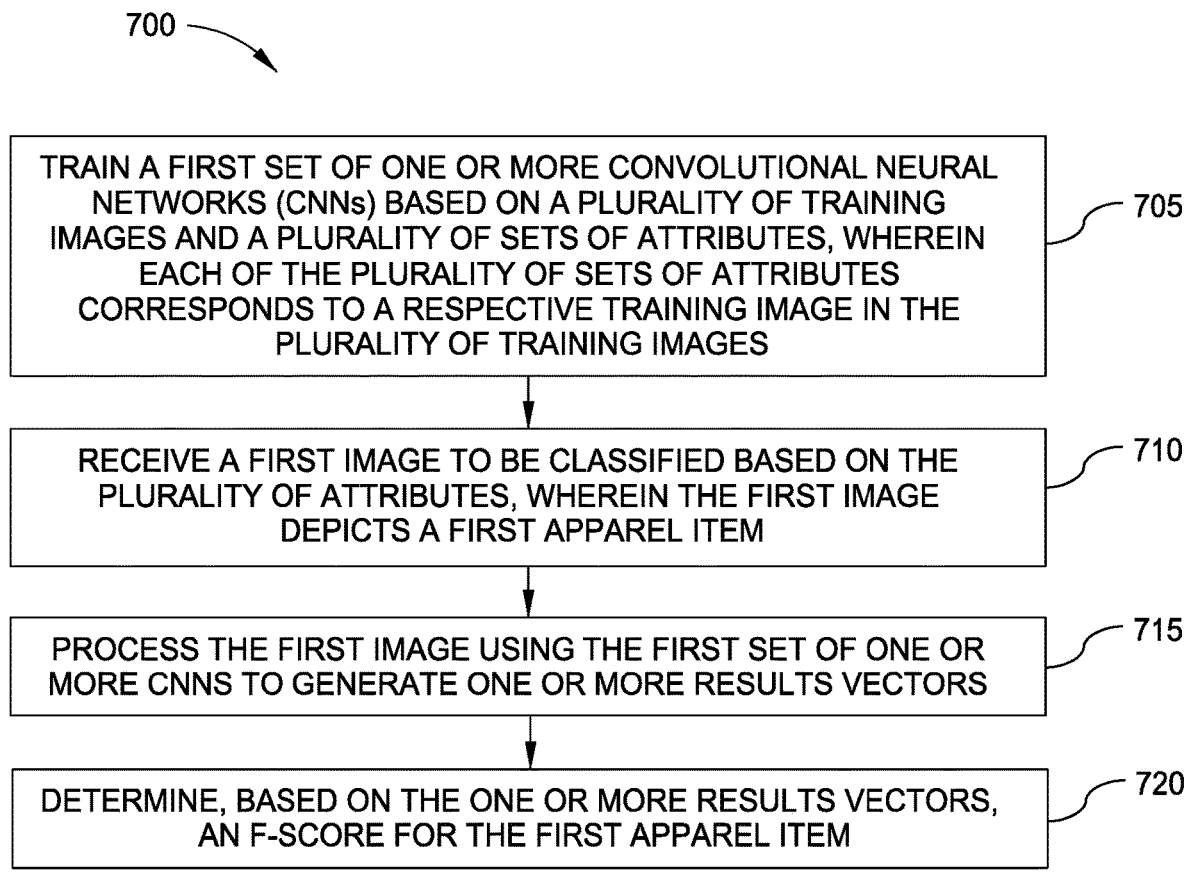
FIG. 7 is a flow diagram illustrating a method of training and using convolutional neural networks to classify apparel items, according to one embodiment disclosed herein.

FIG. 7 is a flow diagram illustrating a method 700 of training and using convolutional neural networks to classify apparel items, according to one embodiment disclosed herein. The method 700 begins at block 705, where the Cognitive Application 130 trains a first set of one or more CNNs based on a plurality of training images and a plurality of sets of attributes, wherein each of the plurality of sets of attributes corresponds to a respective training image in the plurality of training images. At block 710, the Cognitive Application 130 receives a first image to be classified based on the plurality of attributes, wherein the first image depicts a first apparel item. The method then proceeds to block 715, where the Cognitive Application processes the first image using the first set of one or more CNNs to generate one or more results vectors. Finally, at block 720, the Cognitive Application 130 determines, based on the one or more results vectors, an f-score for the first apparel item.

Embodiments of the present disclosure enable the generation of f-scores for apparel items based on images of the item. In an embodiment, these f-scores are quantitative, and allow for the objective comparison of apparel items across any number of dimensions. Advantageously, embodiments of the present disclosure capture data about apparel items that may be imperceptible or extremely subtle to a human user, which allows for more reliable and accurate selections. Similarly, embodiments disclosed herein are objective, such that two items with similar f-scores are objectively similar, without regard for personal taste or the skill of the user. For example, in one embodiment, a user may find a pair of shoes that they like, but cannot purchase. The user may process these shoes using embodiments disclosed herein to generate an f-score for them. The user may then find other pairs of shoes that they can buy (e.g., online or in a local store), take a picture of the shoes, and process it with the above embodiments. The user can then easily determine which pair of shoes is most similar to the ideal pair based on the generated f-scores. Of course, many other uses of the present disclosure are apparent to one of ordinary skill, including commercial and business implementations.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Cognitive Application 130 or related data available in the cloud. For example, the Cognitive Application 130 could execute on a computing system in the cloud and generate f-scores based on images. In such a case, the Cognitive Application 130 could train and use convolutional neural networks and store the CNNs and generated f-scores at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer program product comprising a computer-readable storage medium having computer-readable program code embodied therewith, the computer-readable program code executable by one or more computer processors to perform an operation comprising:
   identifying a plurality of training images, wherein each training image depicts a respective apparel item, and wherein each training image is associated with a corresponding set of tags, each tag including information about a respective attribute in a plurality of attributes;
   training a first convolutional neural network (CNN) based on the plurality of training images and a first attribute in the plurality of attributes;
   iteratively refining the first CNN by, for each respective attribute in the plurality of attributes:
      removing a set of neurons from the first CNN, wherein the removed set of neurons correspond to a classifier, prediction, or multinomial-prediction layer; and
      retraining the first CNN based on the plurality of training images and the respective attribute;
   upon determining that the first CNN has been trained based on each of the plurality of attributes, generating a first set of one or more trained CNNs based on the first CNN;
   receiving a first image to be classified based on the plurality of attributes, wherein the first image depicts a first apparel item;
   processing the first image using the first set of one or more trained CNNs to generate one or more results vectors; and
   determining, based on the one or more results vectors, an f-score for the first apparel item.

2. The computer program product of claim 1, the operation further comprising:

processing the first image with one or more machine learning models to determine a first apparel category to which the first apparel item belongs; and determining to process the first image using the first set of one or more trained CNNs based on the determined first apparel category.

3. The computer program product of claim 2, the operation further comprising:

receiving a second image to be classified, wherein the second image includes a second apparel item;

processing the first image with the one or more machine learning models to determine a second apparel category to which the second apparel item belongs; and determining to process the first image using a second set of one or more trained CNNs based on the determined second apparel category.

4. The computer program product of claim 1, the operation further comprising:

determining that a public event has occurred;

retrieving at least one additional training image associated with the public event; and refining at least one of the first set of one or more trained CNNs based on the at least one additional training image.

5. The computer program product of claim 1, the operation further comprising determining a predicted popularity for the first apparel item based on the determined f-score and one or more trend vectors corresponding to one or more attributes in the plurality of attributes.

6. The computer program product of claim 5, wherein a first trend vector of the one or more trend vectors corresponds to the first attribute in the plurality of attributes, wherein the first attribute comprises a plurality of categories, and wherein the first trend vector comprises information about a popularity of each of the plurality of categories.

7. A system comprising:

one or more computer processors; and a memory containing a program which when executed by the one or more computer processors performs an operation, the operation comprising:

identifying a plurality of training images, wherein each training image depicts a respective apparel item, and wherein each training image is associated with a corresponding set of tags, each tag including information about a respective attribute in a plurality of attributes;

training a first convolutional neural network (CNN) based on the plurality of training images and a first attribute of the plurality of attributes;

iteratively refining the first CNN by, for each respective attribute in the plurality of attributes:

removing a set of neurons from the first CNN, wherein the removed set of neurons correspond to a classifier, prediction, or multinomial-prediction layer; and retraining the first CNN based on the plurality of training images and the respective attribute;

upon determining that the first CNN has been trained based on each of the plurality of attributes, generating a first set of one or more trained CNNs based on the first CNN;

receiving a first image to be classified based on the plurality of attributes, wherein the first image depicts a first apparel item;

processing the first image using the first set of one or more CNNs to generate one or more results vectors; and determining, based on the one or more results vectors, an f-score for the first apparel item.

8. The system of claim 7, the operation further comprising:

processing the first image with one or more machine learning models to determine a first apparel category to which the first apparel item belongs; and determining to process the first image using the first set of one or more CNNs based on the determined first apparel category.

9. The system of claim 8, the operation further comprising:

receiving a second image to be classified, wherein the second image includes a second apparel item;

processing the first image with the one or more machine learning models to determine a second apparel category to which the second apparel item belongs; and determining to process the first image using a second set of one or more CNNs based on the determined second apparel category.

10. The system of claim 7, the operation further comprising:

determining that a public event has occurred; and refining at least one of the first set of one or more CNNs based on at least one additional training image associated with the public event.

11. The system of claim 7, the operation further comprising determining a predicted popularity for the first apparel item based on the determined f-score and one or more trend vectors corresponding to one or more attributes in the plurality of attributes.

* * * * *